(12) United States Patent
Zheng et al.

(10) Patent No.: US 9,473,527 B1
(45) Date of Patent: Oct. 18, 2016

(54) AUTOMATICALLY GENERATED AND SHARED WHITE LIST

(75) Inventors: Steed Zheng, Nanjing (CN); Chao Fang, Nanjing (CN); Jan Deng, Nanjing (CN)

(73) Assignee: Trend Micro Inc., Tokyo (JP)

( * ) Notice: Subject to any disclaimer, the term of this patent is extended or adjusted under 35 U.S.C. 154(b) by 1090 days.

(21) Appl. No.: 13/102,012

(22) Filed: May 5, 2011

(51) Int. Cl.
   *G06F 12/16* (2006.01)
   *H04L 29/06* (2006.01)
   *G06F 21/56* (2013.01)

(52) U.S. Cl.
   CPC ........... *H04L 63/145* (2013.01); *G06F 21/564* (2013.01)

(58) Field of Classification Search
   USPC .......................... 726/24; 707/6; 713/187, 188
   See application file for complete search history.

(56) References Cited

U.S. PATENT DOCUMENTS

| | | | |
|---|---|---|---|
| 7,188,367 B1 * | 3/2007 | Edwards et al. ................. | 726/24 |
| 7,398,399 B2 * | 7/2008 | Palliyil et al. ................. | 713/187 |
| 7,854,007 B2 * | 12/2010 | Sprosts et al. ................... | 726/24 |
| 8,010,469 B2 * | 8/2011 | Kapoor ................... | G06F 9/505 |
| | | | 706/20 |
| 8,387,146 B2 * | 2/2013 | Parish et al. ..................... | 726/24 |
| 8,407,804 B2 * | 3/2013 | Todorovic ....................... | 726/24 |
| 8,621,634 B2 * | 12/2013 | Turbin .................. | G06F 21/562 |
| | | | 706/62 |
| 2007/0130140 A1 * | 6/2007 | Cytron et al. ..................... | 707/6 |
| 2007/0180509 A1 * | 8/2007 | Swartz .................. | G06F 9/4406 |
| | | | 726/9 |
| 2009/0083852 A1 * | 3/2009 | Kuo ...................... | G06F 21/564 |
| | | | 726/22 |
| 2010/0083380 A1 * | 4/2010 | Harris .................. | G06F 21/565 |
| | | | 726/24 |

* cited by examiner

*Primary Examiner* — Amare F Tabor
(74) *Attorney, Agent, or Firm* — Beyer Law Group LLP

(57) ABSTRACT

Each time a version of a virus pattern is downloaded to a local computer a scanned file cache is generated including all files scanned by that version. A modified file cache is also generated including all files modified while that version is present. After a minimum time interval or after a minimum number of virus pattern versions, a white list is generated by combining the existing white list, versions of the scanned file cache and the modified file cache. The white list (and the other caches) is represented by a single binary digit per file that is indexed by the i-node number of the file's i-node. A bundle of files (or their unique identifiers) on the white list is created and uploaded to a cloud storage service. A local computer sends a request to the storage service for the white list for a particular bundle which is then downloaded to the local computer.

17 Claims, 9 Drawing Sheets

Data Structure for Full Disk Cache

Data Structure for Full Disk Cache

FIG. 2

| 112 Pattern | 1 | 2 | 3 | 4 | 5 | 6 | 7 | 8 | 9 |
|---|---|---|---|---|---|---|---|---|---|
| 114—SFC | ABC | CDE | FG | AG | AC | CB | AG | AC | |
| 116—MFC | A | BG | A | B | A | B | B | A | |
| 118—WL | | | | | | | | | C |

| 112 Pattern | 122 1 | 2 | 3 | 4 | 5 | 6 | 7 | 8 | 9 | 10 |
|---|---|---|---|---|---|---|---|---|---|---|
| 114—SFC | ABC | ABCD | FG | AG | AC | CB | AG | AC | BE | |
| 116—MFC | A | BG | A | B | A | B | B | A | B | |
| 118—WL | | | | | | | | | | CE |

| 112 Pattern | 132 1 | 2 | 3 | 4 | 5 | 6 | 7 | 8 | 9 | 10 | 11 |
|---|---|---|---|---|---|---|---|---|---|---|---|
| 114—SFC | ABC | ABCD | CDEFG | AG | AC | CB | AG | AC | BE | ABDG | |
| 116—MFC | A | BG | A | B | A | B | B | A | B | CG | |
| 118—WL | | | | | | | | | | | DE |

130

| Applications | Files | Applications | Files |
|---|---|---|---|
| Address Book.app | 2329 | QQ.app | 810 |
| Automator.app | 1802 | QuickTime Player.app | 1861 |
| Calculator.app | 992 | Remote Desktop Connection.app | 779 |
| Chess.app 352 | 124 | Safari.app | 4637 |
| DVD Player.app | 4383 | Stickies.app | 799 |
| Dashboard.app | 12 | System Preferences.app | 142 |
| Dictionary.app | 852 | TextEdit.app | 1892 |
| FileZilla.app | 538 | Time Machine.app | 49 |
| Firefox.app | 328 | VLC.app | 1261 |
| Font Book.app | 1550 | iCal.app | 3888 |
| Front Row.app | 13 | iChat.app | 5225 |
| Image Capture.app | 752 | iSync.app | 2193 |
| MPlayer OSX Extended.app | 360 | iTunes.app | 10177 |
| Mail.app | 7711 | p4merge.app | 92 |
| Photo Booth.app | 933 | p4v.app | 220 |
| Preview.app | 3723 | | |

FIG. 7
Bundle Examples

| Bundle Identifier 410 | Bundle Version 420 |
|---|---|
| Pattern Version 430 | 440 |
| Relative File Path 1 452 | MD5 454 |
| Relative File Path 2 462 | MD5 464 |
| ⋮ 472 | ⋮ 474 |

FIG. 8
Cloud White List Format

AUTOMATICALLY GENERATED AND SHARED WHITE LIST

FIELD OF THE INVENTION

The present invention relates generally to scanning computer files for malware. More specifically, the present invention relates to improving the performance of a scan engine via a white list.

BACKGROUND OF THE INVENTION

There are many computer operating systems in use today and each has its advantages and disadvantages. For example, there are operating systems available from Microsoft Corporation, Apple Inc., and Linux as well as many others. Certain operating systems may have performance issues, such as executing more slowly in certain circumstances.

For example, it has been noted that the Mac OS X operating system can be slow in launching large applications such as Xcode, Microsoft Office, iMovie, etc. The process of scanning a computer system for malicious software (i.e., malware) using antivirus software can also be very time-consuming, especially for operating systems such as Mac OS X. A manual scan that takes on order of hours will not be acceptable to many computer users.

While there are many factors that will affect how long it takes antivirus software to scan a particular computer system, it is noted that a file system under an Apple operating system is different than a file system under a Microsoft operating system. For example, the number of actual computer files present in an Apple operating system may be much larger than those present in a Microsoft operating system. It has been estimated that a computer executing Mac OS X may have anywhere from 1,000,000 up to 10,000,000 computer files, while a computer executing a Microsoft operating system may have well under 1,000,000 computer files. In particular, while the browser Safari has more than 4,000 files under Mac OS X, it has only approximately 300 files under the Microsoft operating system.

It is also noted that the performance of a typical scan engine used to scan a computer system for malicious software is related to the number of files to scan but not necessarily to the file size. Given that performance of a scan engine may be adversely affected by a large number of computer files to scan, it is desirable to improve the performance of scan engine for any computer operating system, especially those having a relatively large number of files to scan.

SUMMARY OF THE INVENTION

To achieve the foregoing, and in accordance with the purpose of the present invention, an improved scanning technique is disclosed that generates a white list automatically and shares a white list "in the cloud."

The present technique is able to generate a white list automatically, share this white list in the cloud, and therefore build a local white list much more quickly using the shared white list from the cloud. The technique reduces duplicating scans for the same file and greatly improves the performance of malware scanning, especially when a large number of files need to be scanned. In addition, the resources needed by a local computer to maintain a white list are reduced and the accuracy of a white list is improved.

In one embodiment, a white list is generated by first scanning a computer file on a computer on a first day using a first virus pattern and determining that the computer file is malware free. The computer file is scanned on a second day using a second virus pattern and it is also determined that the computer file is malware free by use of the second virus pattern. If a minimum time has elapsed between the first day and the second day, and it is determined that the computer file has not been modified between the scanning on the first day and the scanning on the second day, then the computer file is added to the white list.

In second embodiment, a white list is generated by first scanning a computer file on a computer using a first virus pattern and determining that the computer file is malware free. The computer file is scanned again using a second virus pattern and it is also determined that the computer file is malware free by use of the second virus pattern. If a minimum number of computer virus pattern versions have been used between the two scannings, and it is determined that the computer file has not been modified between the scannings, then the computer file is added to the white list.

In a third embodiment, a method of automatically generating a white list on a computer includes periodically scanning files on the computer with different, updated versions of an anti-malware pattern file. Each time the computer is scanned by one of the versions, a scanned file cache is created and associated with each version of the virus pattern. Each scanned file cache includes files scanned by one of the versions of the virus pattern. In addition, each time a file is modified the file is added to a modified file cache associated with each version of said the pattern. Each modified file cache includes files modified while the corresponding version of the virus pattern is in use on said computer. The white list is then generated by: forming the set intersection of two of the scanned file caches separated by a minimum interval; forming the set union of an existing white list and the formed set intersection; and then subtracting all files in all of the modified file caches from the formed set union. The minimum interval may be a certain number of days or a certain number of versions of a virus pattern that have been applied to the computer.

BRIEF DESCRIPTION OF THE DRAWINGS

The invention, together with further advantages thereof, may best be understood by reference to the following description taken in conjunction with the accompanying drawings in which:

FIG. 2 illustrates when a pattern version 9 is first introduced to the computer system.

FIG. 3 illustrates that a new pattern version number 10 has been introduced and that therefore the oldest SFC and MFC are no longer needed.

FIG. 4 illustrates that a new pattern version number 11 has been introduced and that therefore the oldest SFC and MFC are no longer needed.

FIG. 7 shows a list of bundle examples.

FIG. 8 is an example of a cloud white list format.

DETAILED DESCRIPTION OF THE INVENTION

Many antivirus security vendors use a white list cache to improve scanning performance. The cache stores representations of files determined to be free of malware and allows a scanning engine to operate more efficiently. But, the cache will be invalid when a virus pattern is updated. A new virus pattern contains information on viruses which were not included in older patterns. Thus, it is possible that a file present in the cache that was verified to be safe by an old pattern will be identified as a virus by a new pattern. So, when a new pattern is updated, the cache should be considered invalid.

It can be more useful if a security vendor provides a white list cache which will always be valid even when a virus pattern is updated. There are challenges, though, in providing a white list which is always valid. For one, it can be difficult and tedious to manually maintain a white list. In addition, a software program that belongs in the white list may have many versions, which increases the difficulty of maintaining an accurate white list. Accordingly, the present invention provides a full disk cache to represent the white list, a technique for generating the white list automatically, and the ability to share the white list in the cloud.

Full-Disk Cache

In many operating systems such as Linux, Solaris UNIX, Mac OS X, or any UNIX-like operating system, a file is represented by an index node (or i-node) data structure in the file system. Associated with each i-node is a unique numeric value representing each file (the i-node number) that increases when a new file is created. Because an i-node data structure stores a variety of information for each file the use of i-nodes takes up a lot of capacity in a computer system. It is realized that a great deal of capacity can be saved if a single bit is used to represent a file and to indicate whether or not a file is present in the white list cache or not. For example, the bit may be set to indicate that the file is present in the white list or vice versa.

Figure 1:
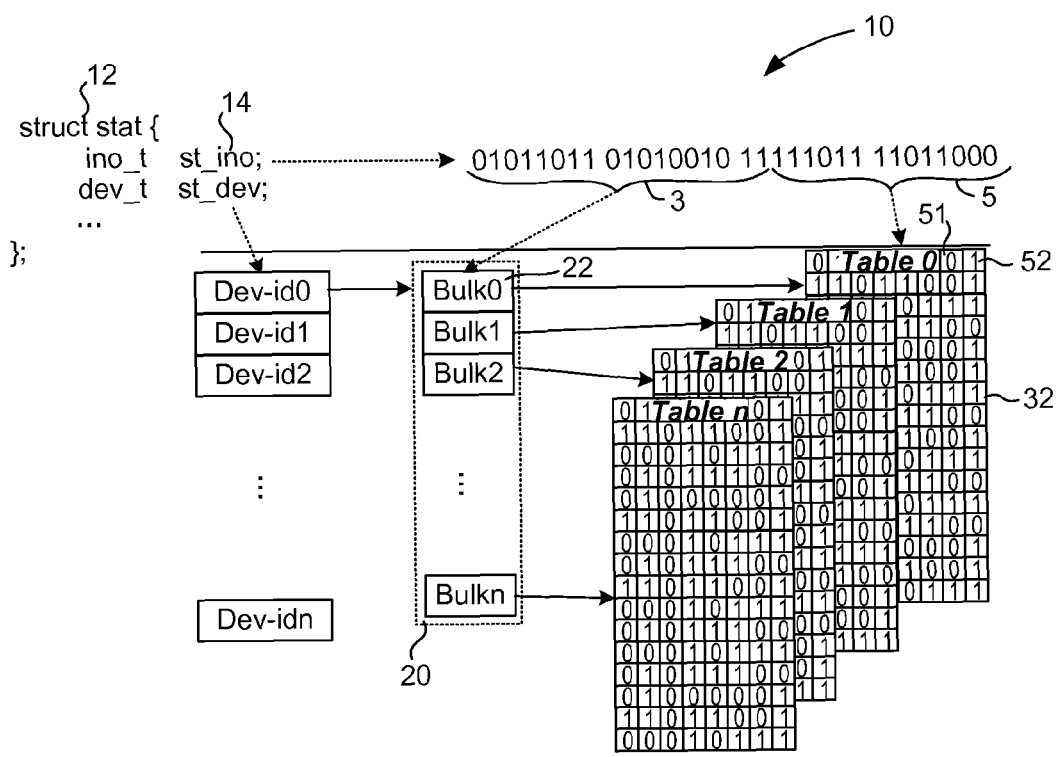
FIG. 1 illustrates one embodiment of a data structure for a full-disk cache.

FIG. 1 illustrates one embodiment of a data structure 10 for a full-disk cache. The invention makes use of the "stat" data structure 12 which a standard i-node data structure in UNIX and Linux; a partial definition is shown. The data structure includes the i-node number 14. Of course, other similar structures may also be used. The full structure 12 is listed below:

```
struct stat { /* when _DARWIN_FEATURE_64_BIT_INODE is
NOT defined */
    dev_t       st_dev;          /* device i-node resides on */
    ino_t       st_ino;          /* i-node number */
    mode_t      st_mode;         /* i-node protection mode */
    nlink_t     st_nlink;        /* number or hard links to the file */
    uid_t       st_uid;          /* user-id of owner */
    gid_t       st_gid;          /* group-id of owner */
    dev_t       st_rdev;         /* device type, for special file
                                    i-node */
    struct timespec st_atimespec; /* time of last access */
    struct timespec st_mtimespec; /* time of last data modification */
```

-continued

```
    struct timespec st_ctimespec; /* time of last file status change */
    off_t       st_size;         /* file size, in bytes */
    quad_t      st_blocks;       /* blocks allocated for file */
    u_long      st_blksize;      /* optimal file sys I/O ops block
                                    size */
    u_long      st_flags;        /* user defined flags for file */
    u_long      st_gen;          /* file generation number */
};
```

In addition to use of the data structure 12, the invention makes use of various data structures and pointers to implement the white list cache and other caches described below. The i-node number typically has 32 bits and the invention splits these bits into a first portion 3 and a second portion 5 used for indexing into other data structures. These portions are configurable; in this embodiment the first portion has 18 bits and the second portion has 14 bits. The first portion 3 indexes into a data structure 20 including Bulk pointers that each reference a particular table. Once a particular table is referenced, then the second portion 5 is used to index into the table and identify a single bit. For example, portion 3 is used to identify a bulk pointer 22 that references table 32. Portion 5 is then used to index and identify a single bit within this table.

In general, the higher L bits of the i-node number are used as an index into these cache tables. When a file is identified (for any of a variety of reasons) its i-node data structure is found and the higher L bits of its i-node number are calculated as a key. This key is then found in the Bulk pointers which refer to one of the cache tables that contains the actual white list. Each cache table is a binary array, and each bit within each table denotes whether a file is in the white list cache or not. After the Bulk pointer has been found, the lower (32-L) bits are used as another index in order to find the exact bit in the cache table that uniquely identifies that file.

In a specific example, each cache table shown in FIG. 1 will occupy 16 bytes of memory. In table 32 the seventh bit 51 is not set indicating that the file uniquely identified by that i-node number is not present in the white list. By contrast, the eighth bit 52 is set indicating that its corresponding file is present in the white list. A bit not being set may also indicate that the file has not been scanned or that this particular i-node number does not represent any file.

This data structure that uses a single bit to identify whether or not a file is present in a white list is advantageous in reducing memory waste. I-node numbers are partially continuous meaning that there may be large blocks of i-node numbers that do not represent actual computer files. Thus, a cache table will not be built for any i-node numbers with the same bulk key that do not exist on the computer, thus saving memory. In general, a cache table (such as table 32) will only be built where there is a file whose i-node number begins with the corresponding bulk key.

As mentioned, these cache tables of FIG. 1 may be used to implement the white list cache of the present convention. A similar structure using different cache tables may also be used to implement the scanned file cache and the modified file cache as described below.

Use of such a full-disk cache has a number of benefits. For one, repeatedly scanning an unchanged file can be avoided. Also, the time it takes to launch a scan engine after the first launching can be reduced. Performance tests with and without a full-disk cache reveal a marked improvement when such a cache is used. The cache, though, has the potential to be invalid when the virus pattern is updated or the scan engine is updated. The reason a cache may be invalid when the scan engine is updated is similar to a pattern update. A new engine might contain a new mechanism to detect a virus. So, a file being verified as safe by an old engine might be identified as a virus by the new engine. The below disclosure addresses this issue.

Automatic Generation of White List Cache

In one embodiment, an assumption may be made that a particular file should be considered safe (i.e., is not malware) if it has been scanned and the scanning engine does not find any malware in the file after a certain number of patterns (N) or after a certain time interval. I.e., if a file is verified to be safe by the first pattern and then it is also scanned by the (N+1) pattern and no malware is found, then the file may be added to the white list. The file need not necessarily be scanned by every single pattern in between. For example, if a file has been scanned by the first pattern and by the fifth pattern no malware has been found then the file may be considered safe. In another example, if a file is scanned twice and 20 days have elapsed between scanning then the file may be considered safe. The values for the number of patterns and the elapsed time between scanning may be represented by constants, e.g., the constants N and M are integer values that may be configurable. In general, most files are not modified frequently and the files that users do access or modify are relatively few. Thus, the assumption may be made that once a file is considered safe that it may be considered safe for a period of time. It has been observed that out of a total number of files, less than 2% are accessed or modified after 15 days.

Using a specific example, consider that a file has been scanned at least twice using a pattern A on day A and then again using a pattern B on day B. The file may then be considered safe if it matches one of the following conditions and has not been modified:
Pattern B−Pattern A>=N (where patterns are identified by integer version numbers); or
Day B−Day A>=M (where days are identified by consecutive integers).

In another embodiment, the file may only be considered safe if it matches both of the above conditions. Using a specific example where N=3 and M=30, if a file is scanned using pattern #2 and then scanned again at some point in the future using pattern #5, then the file will be considered safe. If the file is scanned first on January 15 and then scanned again on February 20, the file will also be considered safe because more than 30 days have elapsed between scanning. In general, the file may be automatically added to the white list cache when it satisfies one of the above conditions (or perhaps both) and the file has not been modified since day A.

To implement automatic generation of the white list, various other caches, variables and formulas are used. A scanned file cache (SFC) is defined as a cache which contains all files which have been scanned by a particular version of a virus pattern. A new SFC is created whenever the pattern is updated. A modified file cache (MFC) is defined as a cache which contains all files which are modified during the time period in which a particular version of a virus pattern is being used. Accordingly, new versions of the SFC and the MFC will be created each time the pattern is updated. A particular version of a virus pattern may be denoted by an integer and represented by the variable "n." Of course, a scan engine need not begin scanning with pattern No. 1, but may begin scanning with pattern No. 4,523 (for example) as long as subsequent pattern version numbers increase by integer values. The constant "N" is a configurable value and represents an interval of pattern versions (or an interval of a time period such as days) that must occur before a file may be added to the white list. For example, the default value may be N=14.

It is then assumed that the caches WL(n), SFC(n) and MFC(n) represent respectively the white list, the scanned file cache and the modified file cache at a particular point in time when the virus pattern version "n" is in use. The white list at a particular point in time may then be defined by the following formulas:

$$WL(n) = \text{null} \qquad // \text{if } n <= N+1;$$

$$WL(n) = WL(n-1) \cup (SFC(n-1) \cap SFC(n-N-1)) -$$
$$(MFC(n-1) \cup MFC(n-2) \cup \cdots$$
$$\bigcup MFC(n-N-1)) \qquad // \text{if } n > N+1.$$

Thus, if the default value of N=14 is used then the white list will be empty from when the first version of the pattern is used up through the 15th version. After the 15th version, then the white list will include the files as dictated by the second formula above.

Because many different pattern versions may be used, it can be useful to limit the number of versions of the SFC and the MFC that are saved within the system. In one embodiment, we only keep N+1 versions of the SFC and the MFC. Therefore, when a new pattern version is received and the new SFC and MFC are calculated, the oldest SFC may be merged into the next oldest SFC using the following formula:

$$SFC(n-N) = SFC(n-N) \cup (SFC(n-N-1) -$$
$$MFC(n-N)) \qquad // \text{if } n > N+1.$$

The MFC will not be merged. The oldest MFC will be deleted if n>N+1.

The following example may be useful in understanding one embodiment of the invention. In this example assume that N=7, that various computer files A, B, C, D, E, F and G exist on the computer, and that pattern version numbers 1-9 are consecutively updated and applied to the computer. Also, it may be assumed a file is scanned when a customer accesses the file on the computer and the real-time scan is turned on or where the customer manually scans the file. Of course, files on a computer may be scanned using other configurations such as periodic scans, etc.

FIGS. 2-4 illustrate a graphical view of snapshots of the computer system at particular points in time as the pattern version is updated. FIG. 2 illustrates 110 when a pattern version 9 is first introduced to the computer system. Shown are pattern version numbers 112 in columns indicating pattern versions that are introduced to a computer system for use in scanning. SFC 114 indicates the contents of a scanned file cache after a particular pattern version number has been introduced. MFC 116 indicates the contents of a modified file cache after a particular pattern version number has been introduced. WL 118 indicates the contents of the white list cache after a particular pattern version number has been introduced.

In the first column of FIG. 2 pattern version number 1 has been introduced onto the computer and files ABC are scanned using this version; therefore, SFC=ABC. While this pattern version is present only the file A is modified; therefore, MFC=A. The white list is the empty set at this point in time because at least 8 patterns must be used before a white list can be created (i.e., N=7). Next, when pattern version number 2 is introduced, only the files CDE are scanned and these are added to the new SFC. When the version number 2 is present only files B and G are modified. The pattern continues to be updated on this computer through pattern version number 8 and the white list 118 continues to be the empty set according to the above formulas. But, upon introduction of pattern version number 9 on the computer, the white list may be calculated according to the above second formula. Intuitively, from looking at FIG. 2, it may be observed that only files A and C meet the criterion in that they have each been scanned twice and over 7 patterns have occurred. But, file A fails the second criterion in that it has been modified at the first pattern. Therefore, only file C remains to be placed on the white list 118 at pattern version number 9.

The white list at pattern version number 9 may also be calculated using the above formula:

$$WL(9) = WL(8) \cup (SFC(8) \cap SFC(1)) - (MFC(8) \cup MFC(7)$$
$$\cup \ldots \cup MFC(1)$$
$$= [\,] \cup [A, C] - [A, B, G] = [C]$$

FIG. 3 illustrates 120 that a new pattern version number 10 has been introduced and that therefore the SFC and MFC in column 122 are no longer needed. The SFC for pattern version number 2 may then be calculated using the above formula:

$$SFC(2) = SFC(2) \cup (SFC(1) - MFC(2)) = [C, D, E] \cup$$
$$([A, B, C] - [B, G])$$
$$= [A, C, D, E]$$

In a similar fashion, the white list when pattern version number 10 is introduced may be calculated using the formula for the white list:

$$WL(10) = WL(9) \cup ((SFC(9) \cap SFC(2)) - (MFC(9) \cup$$
$$MFC(8) \cup \ldots \cup MFC(2)$$
$$= [C] \cup [E] - [A, B, G]$$
$$= [C, E]$$

Intuitively, it may be observed from FIG. 3 that file C shall remain on the white list because it has not been changed, and, file E should be added to the white list because it has been scanned at least twice, an interval of at least 7 patterns have elapsed, and file E has not been modified.

FIG. 4 illustrates 130 that a new pattern version number 11 has been introduced and that therefore the SFC and MFC in column 132 are no longer needed. The SFC for pattern version number 3 may then be calculated using the above formula:

$$SFC(3) = SFC(3) \cup (SFC(2) - MFC(3))$$
$$= [F, G] \cup ([A, C, D, E] - [A])$$
$$= [C, D, E, F, G]$$

In a similar fashion, the white list when pattern version number 11 is introduced may be calculated using the formula for the white list:

$$WL(11) = WL(10) \cup ((SFC(10) \cap SFC(3)) - (MFC(10) \cup$$
$$MFC(9) \cup \ldots \cup MFC(3)$$
$$= [C, E] \cup [D, G] - [A, B, C, G]$$
$$= [D, E]$$

Intuitively, it may be observed from FIG. 4 that file C should be removed from the white list because it has recently been changed. File E remains on the white list because it has not been changed, and file D is added to the white list because it has been scanned at least twice, an interval of at least 7 patterns have elapsed, and file D has not been modified.

Figure 5A:
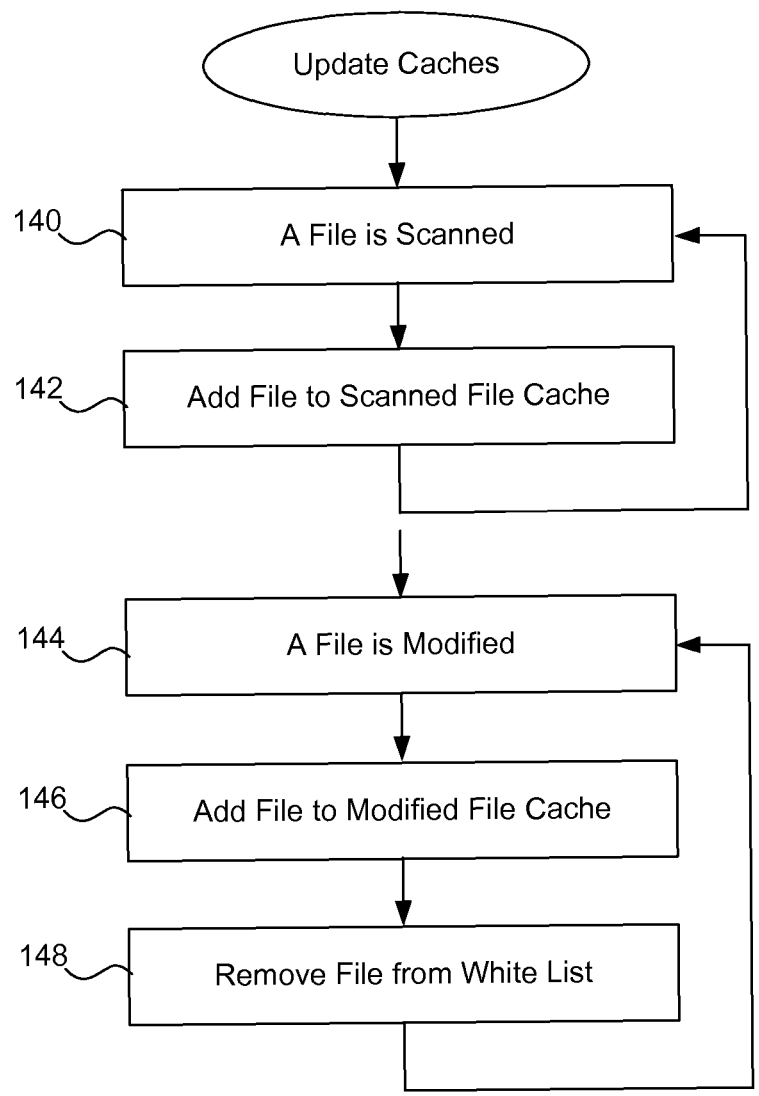
FIG. 5A is a flow diagram describing how the scanned file cache and the modified file cache are kept updated.

FIG. 5A is a flow diagram describing how the scanned file cache and the modified file cache are kept updated. Both of these caches may be updated continuously as described below for use in calculating the white list cache. In step 140 a particular file on a computer is scanned by an antivirus software product. The file may be scanned manually by the user, may be scanned in real time when the file is accessed, may be scanned automatically and periodically by the software product, or may be scanned using some other scheme. Once the file is scanned, in step number 142 this file is added to the scanned file cache. As mentioned above, the scanned file cache may be implemented using the data structure shown in FIG. 1 where a single bit in one of the tables indicates whether or not a particular file is present within the scanned file cache. A bit that has been set may indicate that the file is present in the scanned file cache while a bit that is not set may indicate that either the file has not been scanned or that there is no particular file corresponding to that bit.

In step 144 a particular file on a computer is modified perhaps by a user or software. Once the file is modified, in step number 146 this file is added to the modified file cache. As mentioned above, the modified file cache may be implemented using the data structure shown in FIG. 1 where a single bit in one of the tables indicates whether or not a particular file is present within the modified file cache. A bit that has been set may indicate that the file is present in the modified file cache while a bit that is not set may indicate that either the file has not been modified or that there is no particular file corresponding to that bit. Additionally, in step 148 the file that has been modified is removed from the white list. Although this modified file will be automatically removed from the white list the next time that the pattern is updated and a new white list is calculated, it can be advantageous to immediately remove such a file from the white list because there is no guarantee at this point that the file has not been infected by malware. Thus, step 148 is optional.

Figure 5B:
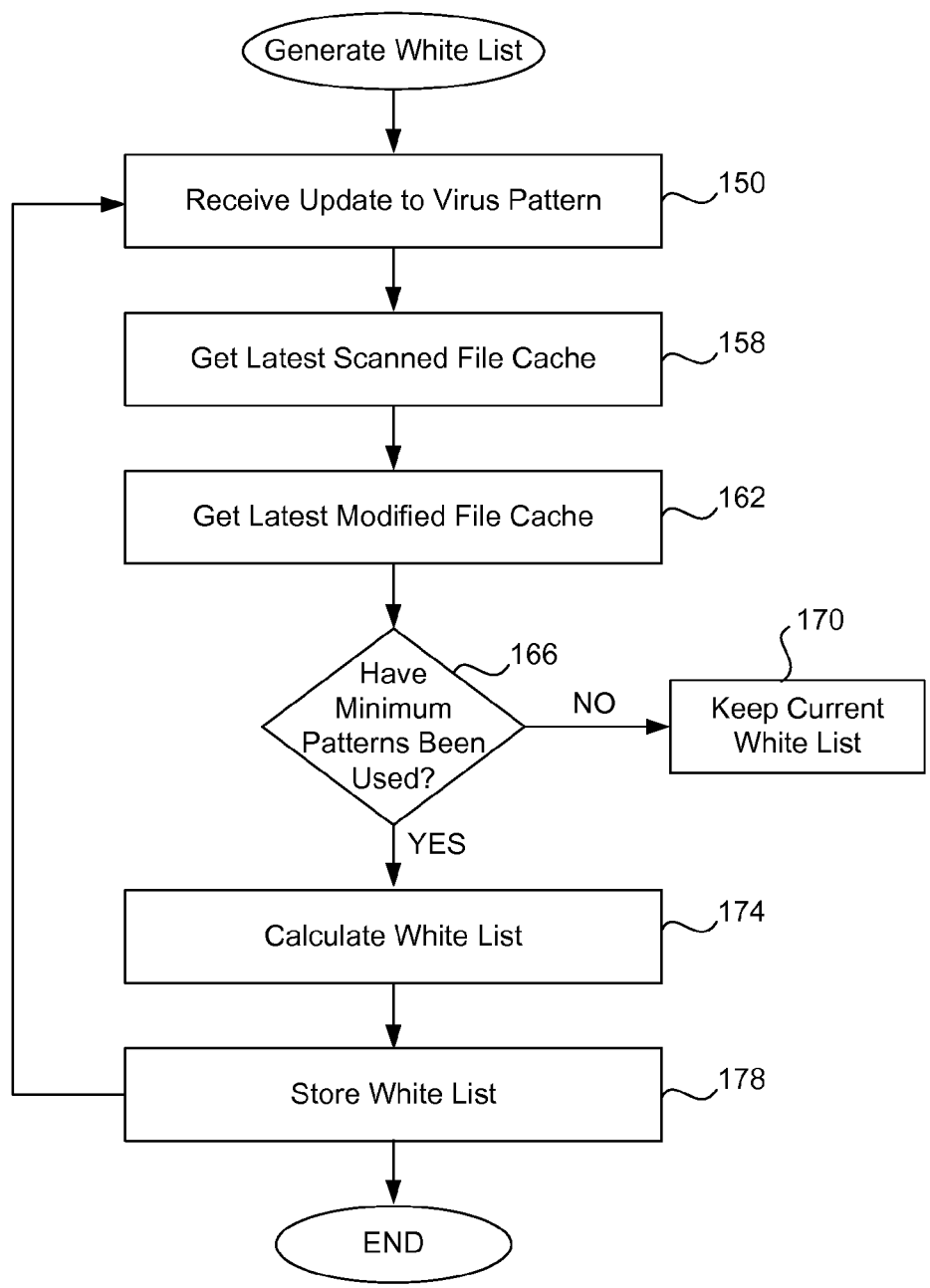
FIG. 5B is a flow diagram describing how a white list may be generated automatically.

FIG. 5B is a flow diagram describing how a white list may be generated automatically. These steps are preferably per-formed each time a virus pattern update is received or whenever it is desirable to calculate a new white list, e.g., after a certain number of days have passed. In step 158 a new update to the virus pattern is received on a local computer system, e.g., as shown in FIG. 2 update pattern number 9 is received. Of course, this process may also be triggered by the passage of time, for example, the numerals 1-9 shown in FIG. 2 may refer to days, in which case a new white list is being calculated on day 9. In steps 158 and 162 the latest scanned file cache and the latest modified file cache are retrieved. For example, these caches may be retrieved by reference to their corresponding data structures in which they are saved on the computer.

In step 166 it is determined whether a minimum number of different patterns have been used on the computer or whether a minimum number of days have passed. FIGS. 2-4 above provide examples. In the case where only the first pattern has been used then the white list will be set equal to the empty set. If the minimum has not been met in step 170 then the current white list is kept and it is not changed. On the other hand, if the minimum has been met, then in step 174 a new white list is calculated using both the scanned file cache and the modified file cache as described above. In an alternative embodiment, if any modified files have been diligently removed from the white list as the files are modified then these modified files would not need to be removed from the white list again at this point. One skilled in the art will understand how to perform set union and intersection functions, and subtraction functions using the scanned file cache and the modified file cache when they are represented in the data structure of FIG. 1. Once the new white list has been calculated, in step number 178 it is stored in memory on the computer using the data structure shown in FIG. 1.

Shared White List

Once a white list has been generated by a particular computer as described above it may be uploaded over the Internet to any suitable storage site in order to be shared with other computers connected to the Internet, that is, it may be shared "in the cloud."

Figure 6:
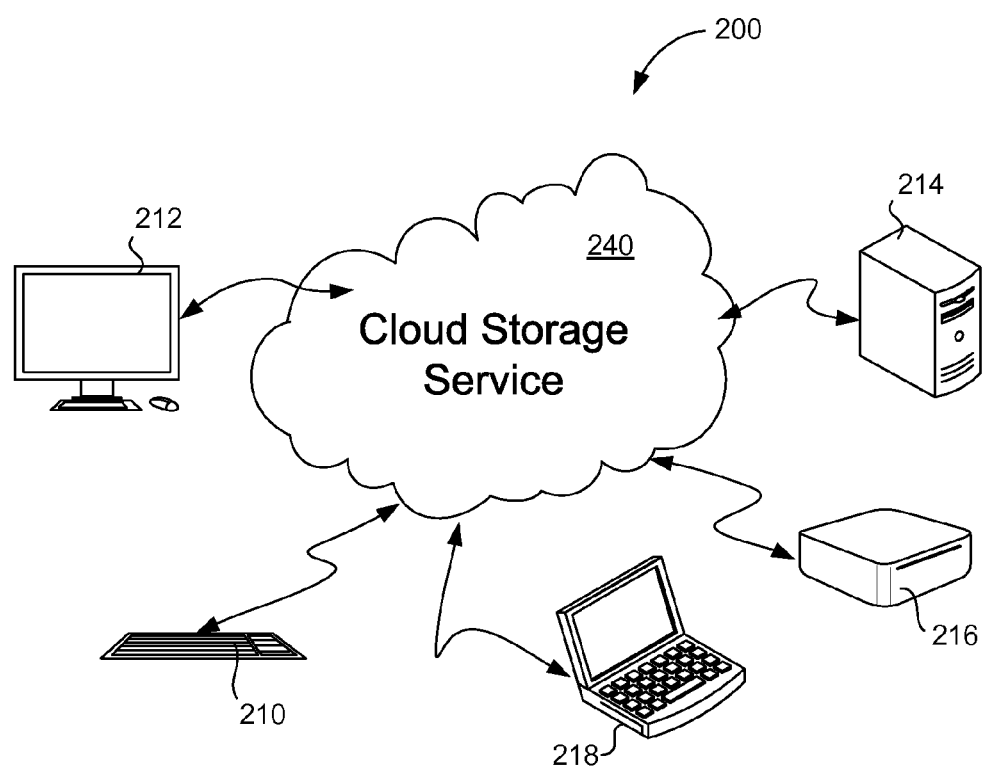
FIG. 6 illustrates a network environment suitable for sharing a white list.

FIG. 6 illustrates a network environment 200 suitable for sharing a white list. Shown are any number of suitable computing devices 210-218 and a cloud storage service 240 accessible over an Internet connection. Although the computing devices 210-218 shown are Apple, Inc. computers, any computing device may be used such as server computers, desktop computers, laptop computers, mobile telephones, tablet computers, etc. Once a white list is developed upon computer 210, for example, it may be uploaded and stored in the cloud storage service 240 and then downloaded and used locally by any other computer such as computer 214.

Cloud storage service 240 may be any suitable storage service accessible over the Internet that allows users to upload computer files for sharing and makes those files available for computer users to download. For example, the services Humyo and SafeSync available from Trend Micro, Inc. may be used, or the services Dropbox or SugarSync may be used. SafeSync is a service that allows a computer user to upload a computer file to a secure data storage cluster and provides the ability for the user to share access to that file with other computer users.

A white list may be shared in the cloud by grouping related files together. Files may be grouped by operating system, by the application to which they pertain, etc. In one embodiment, the concept of a software "bundle" is used to group related software files together. Although a bundle is a term used in conjunction with the Apple operating system to refer to a particular folder, this concept of grouping files together in order to share a white list may be applied to any computer operating system. Similar terms used include "package" and "application directory" used in the RISC operating system, "spatial bundles" used in the Ubuntu operating system, and other. Types of related files that may be grouped together in a bundle or other grouping include operating system files, software packages, applications, frameworks, plug-ins, etc.

A bundle may contain the executable code for the application, any needed resources such as images and sounds, and user data files associated with a particular software application. Whether user data files are included in a bundle depends upon the implementation of each bundle. A bundle will typically have an identifier and a version number, and may have a particular extension such as ".app," ".bundle," or other.

FIG. 7 shows a list of bundle examples 300. Columns 310 and 330 list applications present on a computer, and columns 320 and 340 list the number of files included within each application bundle. For example, the "Chess" application 352 is a software bundle that includes 124 computer files.

FIG. 8 is an example of a cloud white list format 400. In this example, white lists are stored in the cloud and are grouped by bundles or other groups of related files. Included within this format is a bundle identifier 410 that uniquely identifies to which bundle the associated files pertain. For example, the bundle identifier "com.apple.Safari" is used in the Apple operating system to identify a bundle associated with the Safari application. A bundle version 420 identifies the version of a particular bundle and the pattern version 430 identifies that particular virus pattern version in use when the white list was generated locally. In other words, pattern version identifies the latest pattern in use on the local computer when the white list was generated. Relative file paths 452, 462 and 472 identify the path name and file name of each file included within the bundle relative to the local folder or directory in which the file is typically contained. For example, files included as part of the bundle for the Safari application will have a pathname relative to the Safari folder. Message digests 454, 464 and 474 are globally unique identifiers corresponding to each of the files found within the bundle. As known in the art, a message digest is a calculated value for a particular file that is globally unique for that file. Any of a variety of message digests or other globally unique identifiers may be used.

Figure 9:
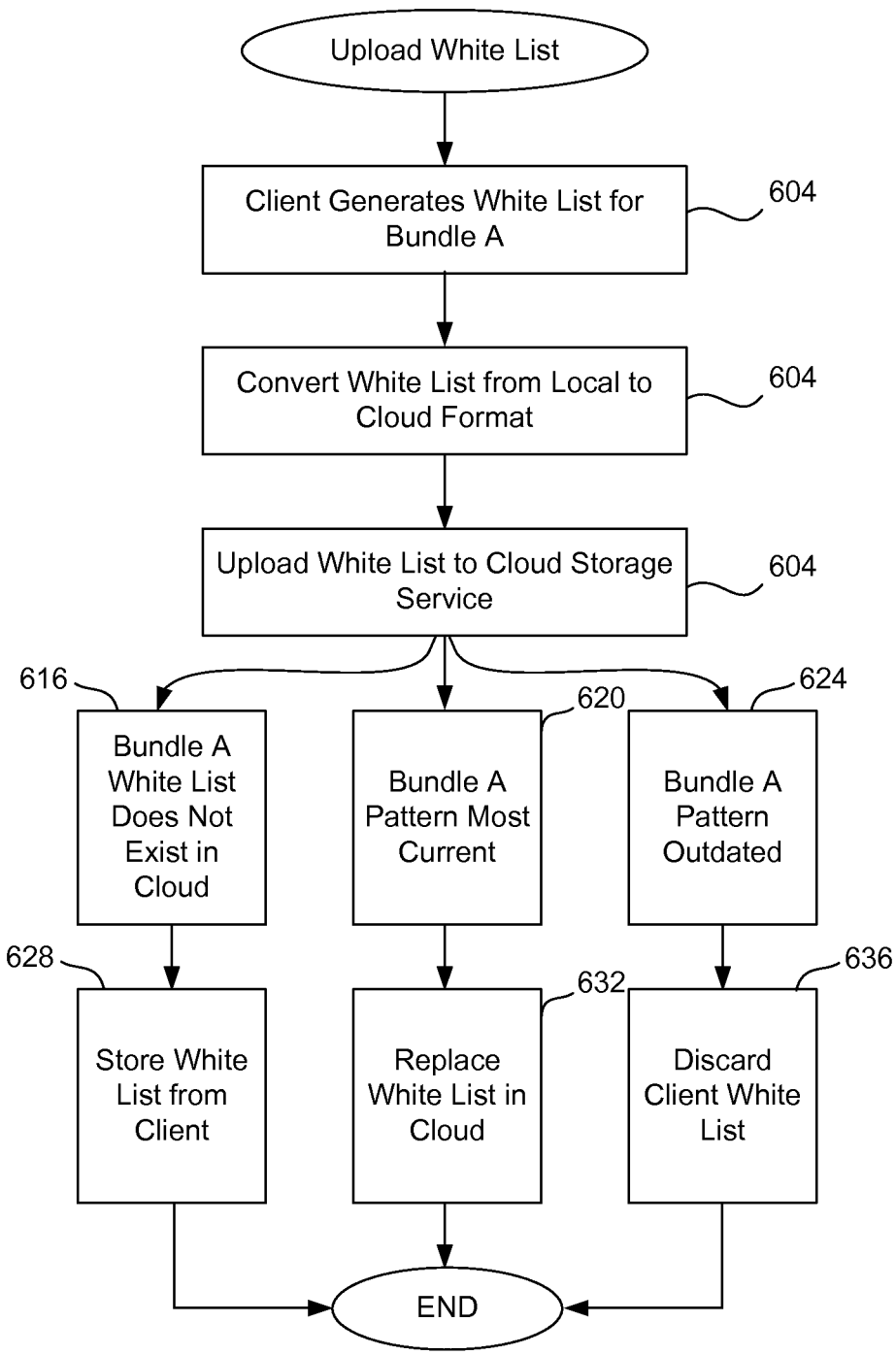
FIG. 9 is a flow diagram describing one embodiment in which a white list is uploaded from a local computer to a cloud storage service.

FIG. 9 is a flow diagram describing one embodiment in which a white list is uploaded from a local computer to a cloud storage service. A white list may be uploaded automatically, periodically, manually by a user, or by using some other scheme. For example, a white list generated on computer 218 may be uploaded onto a server computer within cloud storage service 240. In step 604 a white list is generated on the local computer. This may be a white list as generated in FIG. 5B which includes all files on the local computer that belong on the white list, a white list for a particular folder or directory of computer files, a white list for a particular grouping or bundle of computer files, or some other white list organization. In one particular embodiment, a white list for a particular bundle is desired to be uploaded to the storage service. A bundle is a grouping of files typically found within a certain folder on the computer and includes all files grouped together that implement a particular software application, such as any of the software applications shown in FIG. 7. Once the files and their file names are identified, the i-node for each file is obtained and the i-node number can be used to index into the white list cache to determine if that particular file is present on the white list. If present, then that particular file of the bundle is indicated as being on the white list for bundle A. It is not strictly necessary that all files in a particular bundle be present on the white list. Only a portion of the files within the bundle may be uploaded as long as they are present on the white list. Certain files (executable files) might normally not be changed, while other files such as data files and configuration files might have been changed.

In step 608 the files of a bundle indicated as being on the white list are converted and placed into the cloud white list format. Using the example of FIG. 8, this data structure for a particular bundle is created by adding the bundle identifier, the bundle version, and the current pattern version used on the local computer. For each file identified in step 604 that is present on the white list, the relative path name for this file is added to the data structure and the message digest corresponding to the file is calculated and added as well. Once this cloud white list format has been assembled for a particular bundle it is ready to be uploaded.

In step 612 this assembled white list is then uploaded to the cloud storage service. Depending upon whether a bundle for these particular files already exists within the storage service, one of a number of steps may be taken. In step 616 it is determined whether that particular bundle already exists in the storage service or not. This may be determined by reference to the bundle identifier and bundle version number. Even if the bundle identifier exists with an older version number, it can be useful to also include within the storage service the same bundle with a later version number. If the bundle does not already exist, then in step 628 the uploaded white list from the client is stored within the store service. For example, a local computer may upload a bundle associated with the application Safari using a URL such as: http://www.humyo.com/xxxx/macosx/Safair.app/5.0.1/w1.

In step 620 it is determined that the bundle already exists in the storage service (i.e., same bundle identifier and bundle version number). But, it is also determined that the pattern version number of the uploaded white list is more up-to-date than the pattern version number of the bundle currently stored in the storage service. Accordingly, in step 632 the uploaded white list from the client replaces the white list for the bundle already existing in the cloud. In step 624 it is also determined that the bundle already exists in the storage service. And, it is also determined that the pattern version number of the uploaded white list is earlier than the pattern version number of the bundle currently stored in the storage service. Accordingly, in step 636 the uploaded white list from the client is discarded because the white list in the cloud is more up-to-date.

After a period of time, there may be any number of white lists existing on the storage service. For example, if local computers are uploading white list bundles associated with applications of the Mac OS X operating system, then these white list bundles may be accessed using the following URLs:

http://www.humyo.com/xxxx/macosx/os/10.5.8/w1
http://www.humyo.com/xxxx/macosx/os/10.6.4/w1
http://www.humyo.com/xxxx/macosx/Safari.app/4.0.0/w1
http://www.humyo.com/xxxx/macosx/Safari.app/5.0.0/w1
http://www.humyo.com/xxxx/macosx/Safari.app/5.0.1/w1

Figure 10:
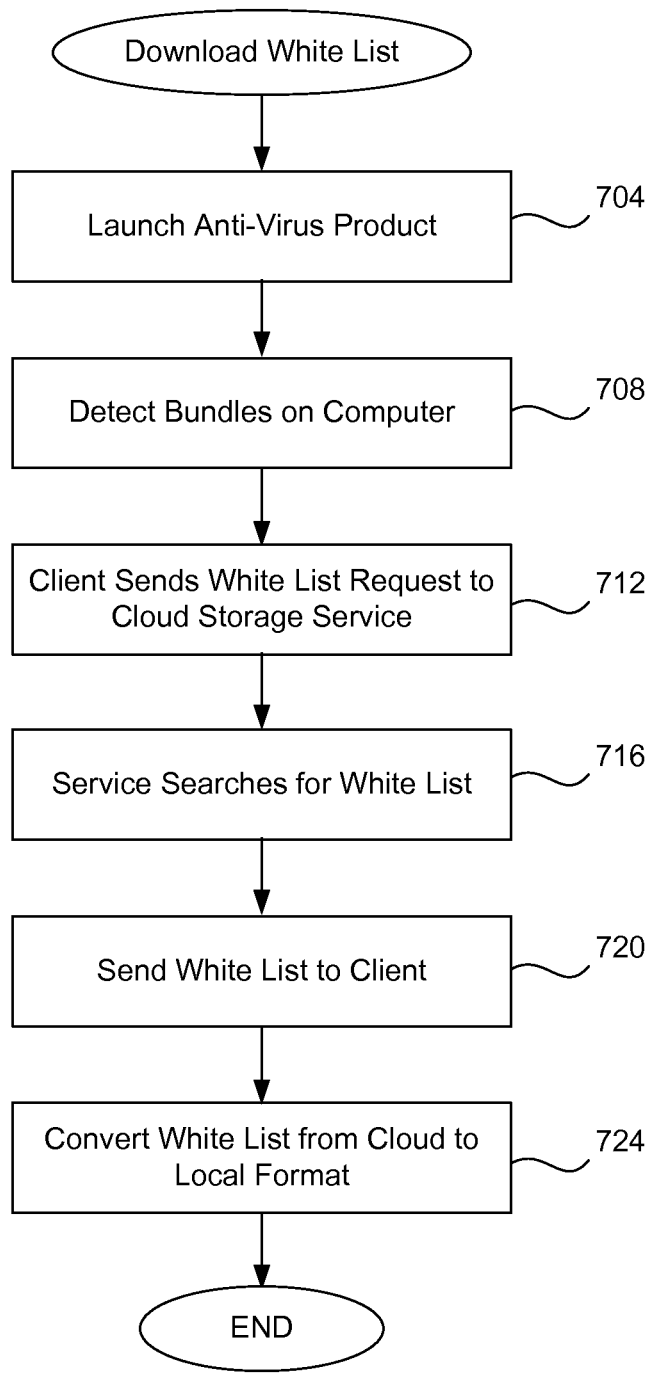
FIG. 10 is a flow diagram describing one embodiment by which a white list is downloaded from a cloud storage service a local computer.

FIG. 10 is a flow diagram describing one embodiment by which a white list is downloaded from a cloud storage service a local computer. Using this embodiment, it is not strictly necessary that a local computer generate and maintain a white list for all computer files. By downloading and using any white lists available on the storage service the local computer is saved the time and resources needed to generate these white lists. In step 704 any suitable antivirus software product is launched on the local computer. At this time, or at the occurrence of the first full disk scan, the product detects software bundles present on the computer in step 708. These bundles may be detected by reference to the bundle identifier and bundle version number, or by reference to any other identifiers used to group related files together. For example, files may be grouped by folder, by directory, by version number etc.

In step 712 the local computer formulates a white list request to send to the cloud storage service. This request may include a request for any bundles that the local computer has identified that are present on the local computer, a request for any white lists available, a request for any white list for a particular operating system or version number, or a request for white lists identified in some other manner. Once identified, this request is sent to the cloud storage service. In step 716 the storage service receives the request and searches its database for a white list corresponding to the one requested. For example, the service searches for a particular white list for a particular bundle identified by bundle identifier and bundle version number, such as the example shown in FIG. 8. In one embodiment, a local computer needing the bundle for the application Safari, version 5.0.1, can use the URL above in step 628 in order to download that white list.

In one embodiment the local computer also sends the current virus pattern version in use. The storage service will only return the requested white list if the pattern version of the white list in the cloud is greater than the pattern version currently in use on the local computer.

Once found, in step 720 this white list is sent to the local computer. It is not necessary that all of the information shown in example of FIG. 8 be sent to the local computer. For example, the storage service may simply send the bundle identifier and bundle version number along with the message digests for each file included with the bundle. It is not strictly necessary that the file names or file paths be sent but they may be sent if desired.

Once received, in step 724 the local computer converts the received white list into its local format. For example, if the local computer is using a format in which the message digests are simply stored in a database, then the received message digests from the storage service may simply be added to the client's database of message digests. In an embodiment in which the local computer's white list is stored using the data structure of FIG. 1, the white list may be converted as follows. The local computer retrieves message digests corresponding to the files in the bundle requested and then compares these retrieved message digests with the message digests downloaded from the storage service. If a match occurs, this indicates that the matched file should then be added to the local computer's white list. Accordingly, the i-node corresponding to the matched file is accessed and its i-node number is used to index into the white list data structure; the binary digit indexed by the i-node number is then set to indicate that this file is present in the white list.

Computer System Embodiment

Figure 11A:
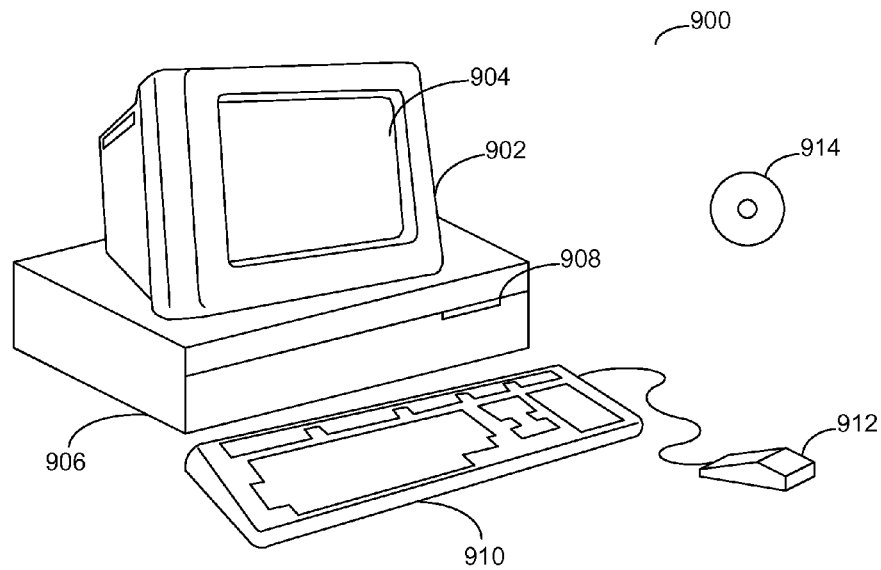
FIGS. 11A and 11B illustrate a computer system suitable for implementing embodiments of the present invention.
Figure 11B:
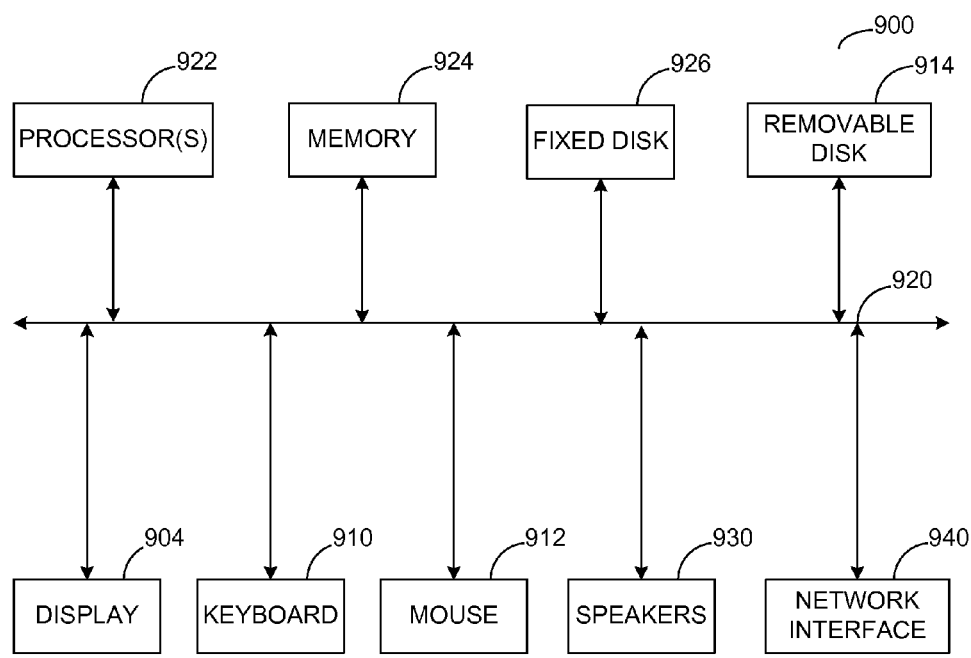

FIGS. 11A and 11B illustrate a computer system 900 suitable for implementing embodiments of the present invention. FIG. 11A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 11B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of generating a white list, said method comprising:
   scanning a computer file on a computer on a first day using a first virus pattern and determining that said computer file is malware free;
   scanning said computer file on a second day using a second virus pattern and determining that said computer file is malware free;
   determining whether a minimum time has elapsed between said first day and said second day;
   determining whether said computer file has been modified between said scanning on said first day and said scanning on said second day; and
   adding said computer file to said white list by changing a single binary digit in a white list data structure when it is determined that said minimum time has elapsed and when it is determined that said computer file has not been modified between said scannings.

2. A method as recited in claim 1 further comprising:
   accessing said single binary digit using an i-node number of said computer file.

3. A method as recited in claim 1 further comprising:
   adding said computer file to a scanned file cache corresponding to said first virus pattern after said computer file has been scanned by said first virus pattern.

4. A method as recited in claim 1 further comprising:
   modifying said first computer file while said first virus pattern is in use on said computer; and
   adding said computer file to a modified file cache corresponding to said first virus pattern.

5. A method as recited in claim 1 further comprising:
   removing said computer file from said white list when it is determined that said computer file has been modified.

6. A method as recited in claim 1 further comprising:
   adding a representation of said computer file to a grouping of related computer files also present on said white list; and
   uploading said grouping to a cloud storage service.

7. A method of generating a white list, said method comprising:
   scanning a computer file on a computer at a first time using a first virus pattern and determining that said computer file is malware free;
   scanning said computer file at a second time using a second virus pattern and determining that said computer file is malware free;
   determining whether a minimum number of virus pattern updates have occurred between said first virus pattern and said second virus pattern;
   determining whether said computer file has been modified between said scanning by said first virus pattern and said scanning by said second virus pattern; and
   adding said computer file to said white list by changing a single binary digit in a white list data structure when it is determined that said minimum number of a virus pattern updates have occurred and when it is determined that said computer file has not been modified between said scannings.

8. A method as recited in claim 7 further comprising:
accessing said single binary digit using an i-node number of said computer file.

9. A method as recited in claim 7 further comprising:
adding said computer file to a scanned file cache corresponding to said first virus pattern after said computer file has been scanned by said first virus pattern.

10. A method as recited in claim 7 further comprising:
modifying said first computer file while said first virus pattern is in use on said computer; and
adding said computer file to a modified file cache corresponding to said first virus pattern.

11. A method as recited in claim 7 further comprising:
removing said computer file from said white list when it is determined that said computer file has been modified.

12. A method as recited in claim 7 further comprising:
adding a representation of said computer file to a grouping of related computer files also present on said white list; and
uploading said grouping to a cloud storage service.

13. A method of automatically generating a white list on a computer, said method comprising:
periodically scanning files on said computer with a periodic version of a virus pattern;
creating a scanned file cache associated with each version of said virus pattern, each scanned file cache including files scanned by one of said versions of said virus pattern;
creating a modified file cache associated with each version of said virus pattern, each modified file cache including files modified while said corresponding version of said virus pattern is in use on said computer;
generating a white list by
forming the set intersection of two of said scanned file caches separated by a minimum interval, forming the set union of an existing white list and said set intersection, and subtracting all files in all of said modified file caches from said set union; and
representing each file in said white list by setting a single binary digit in a white list data structure.

14. A method as recited in claim 13 wherein said minimum interval is an interval of days.

15. A method as recited in claim 13 wherein said minimum interval is an interval between versions of said virus pattern.

16. A method as recited in claim 13 further comprising:
accessing said white list using an i-node number of an i-node data structure.

17. A method as recited in claim 13 further comprising:
representing each file in said scanned file cache by setting a single binary digit in a scanned file cache data structure, and representing each file in said modified file cache by setting a single binary digit in a modified file cache data structure.

* * * * *